(12) United States Patent
Sconce

(10) Patent No.: US 12,454,221 B2
(45) Date of Patent: Oct. 28, 2025

(54) TOW BALL CAMERA ASSEMBLY

(71) Applicant: Matt Sconce, Lake George, MN (US)

(72) Inventor: Matt Sconce, Lake George, MN (US)

( * ) Notice: Subject to any disclaimer, the term of this patent is extended or adjusted under 35 U.S.C. 154(b) by 65 days.

(21) Appl. No.: 18/381,275

(22) Filed: Oct. 18, 2023

(65) Prior Publication Data

US 2025/0128661 A1    Apr. 24, 2025

(51) Int. Cl.
*B60R 1/00*    (2022.01)
*B60D 1/36*    (2006.01)

(52) U.S. Cl.
CPC ............. *B60R 1/003* (2013.01); *B60D 1/36* (2013.01)

(58) Field of Classification Search
CPC .......... B60D 1/245; B60D 1/36; B60D 1/605; B60D 1/62; B60R 1/26; B60R 1/003
USPC .......................................................... 348/148
See application file for complete search history.

(56) References Cited

U.S. PATENT DOCUMENTS

| | | | |
|---|---|---|---|
| 5,159,312 A * | 10/1992 | Engle ................... | B60D 1/60 307/9.1 |
| 5,951,035 A * | 9/1999 | Phillips, Jr. ........... | B60D 1/36 280/477 |
| D484,161 S | 12/2003 | Mendoza | |
| 8,888,121 B2 | 11/2014 | Trevino | |
| 9,731,570 B1 * | 8/2017 | Rodriguez ............. | B60D 1/06 |
| 10,059,161 B1 * | 8/2018 | Salter ................... | B60D 1/065 |
| 10,894,515 B1 | 1/2021 | Li | |
| 10,899,385 B2 | 1/2021 | Gali | |
| 11,014,561 B2 | 5/2021 | Gupta | |
| 11,040,588 B2 | 6/2021 | Niewiadomski | |
| 11,072,284 B2 | 7/2021 | Windeler | |
| 2007/0182820 A1 | 8/2007 | Wang | |
| 2019/0100064 A1 * | 4/2019 | Bika .................... | B60D 1/28 |
| 2020/0114711 A1 * | 4/2020 | Nixon ................... | B60D 1/62 |
| 2021/0218934 A1 | 7/2021 | Gorgees | |
| 2021/0235019 A1 * | 7/2021 | Tonkin ................. | H04N 23/56 |

FOREIGN PATENT DOCUMENTS

| | | | | |
|---|---|---|---|---|
| CA | 2337960 A1 * | 8/2001 | ............ | B60D 1/06 |
| EP | 1160105 A2 * | 12/2001 | ............ | B60D 1/06 |
| WO | WO2018055321 | 3/2018 | | |

OTHER PUBLICATIONS

Amazon.com "Mini Spy Camera Wireless Hidden Home WiFi Security Cameras with App 1080P, Bundle Night Vision Indoor Outdoor iPhone/Android Phone Small Nanny Cam for Cars etc" https://www.amazon.com/Wireless-Security-Cameras-Activated-Outdoor/dp/B07PBS5QJJ Mar. 6, 2019, 6 Pages. (Year: 2019).*

* cited by examiner

*Primary Examiner* — Nathnael Aynalem

(57) ABSTRACT

A tow ball camera assembly includes a tow ball that has a storage space is integrated into the tow ball. A camera unit is insertable into the storage space in the tow ball thereby facilitating the camera unit to capture imagery of a trailer hitch when the vehicle is backed to position the tow ball beneath the trailer hitch. The camera unit is in remote communication with a personal electronic device thereby facilitating a driver of the vehicle to see when the tow ball is properly positioned to attach the trailer hitch to the tow ball. A cap is removably attachable to the tow ball and the cap is positioned in the storage space when the cap is attached to the tow ball thereby facilitating the cap to conceal the camera unit. The cap is removable from the tow ball to expose the camera unit.

6 Claims, 5 Drawing Sheets

TOW BALL CAMERA ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tow ball devices and more particularly pertains to a new tow ball device for facilitating a driver of a vehicle to see when a tow ball is aligned with a trailer hitch while the vehicle is being backed. The device includes a tow ball with a storage space and a camera unit that is positioned in the storage space. The camera unit is in remote communication with a personal electronic device to facilitate the driver to view imagery captured by the camera unit for aligning the tow ball with the trailer hitch.

(2) Description of Related Art Including Information Disclosed Under 37 CFR 1.97 and 1.98

The prior art relates to tow ball devices including a tow alignment device that includes a camera that is mountable to a tow ball and a mirror that is mounted to a trailer hitch for reflecting a beam of light emitted by the camera for aligning the tow ball with the trailer hitch. The prior art discloses a variety of trailer hitch assisting devices that each at least includes a camera that is mounted to a rear of a vehicle to facilitate a driver of the vehicle to accurately back the vehicle to attach to a trailer. The prior art discloses an alignment camera device that includes a camera that is insertable into a tow hitch on a vehicle to back the vehicle to a trailer. The prior art discloses a vehicle backing camera device that includes a camera unit that is mounted to a rear of a vehicle and which is in remote communication with a personal electronic device.

BRIEF SUMMARY OF THE INVENTION

An embodiment of the disclosure meets the needs presented above by generally comprising a tow ball that has a storage space is integrated into the tow ball. A camera unit is insertable into the storage space in the tow ball thereby facilitating the camera unit to capture imagery of a trailer hitch when the vehicle is backed to position the tow ball beneath the trailer hitch. The camera unit is in remote communication with a personal electronic device thereby facilitating a driver of the vehicle to see when the tow ball is properly positioned to attach the trailer hitch to the tow ball. A cap is removably attachable to the tow ball and the cap is positioned in the storage space when the cap is attached to the tow ball thereby facilitating the cap to conceal the camera unit. The cap is removable from the tow ball to expose the camera unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
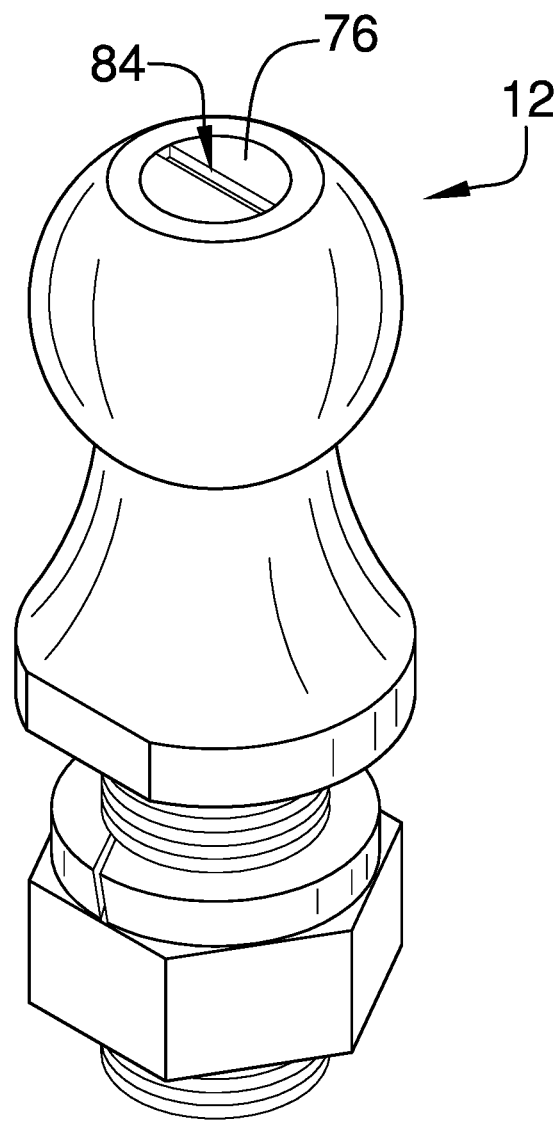
FIG. 1 is a top perspective view of an embodiment of the disclosure showing a cap installed in a tow ball.
Figure 2:
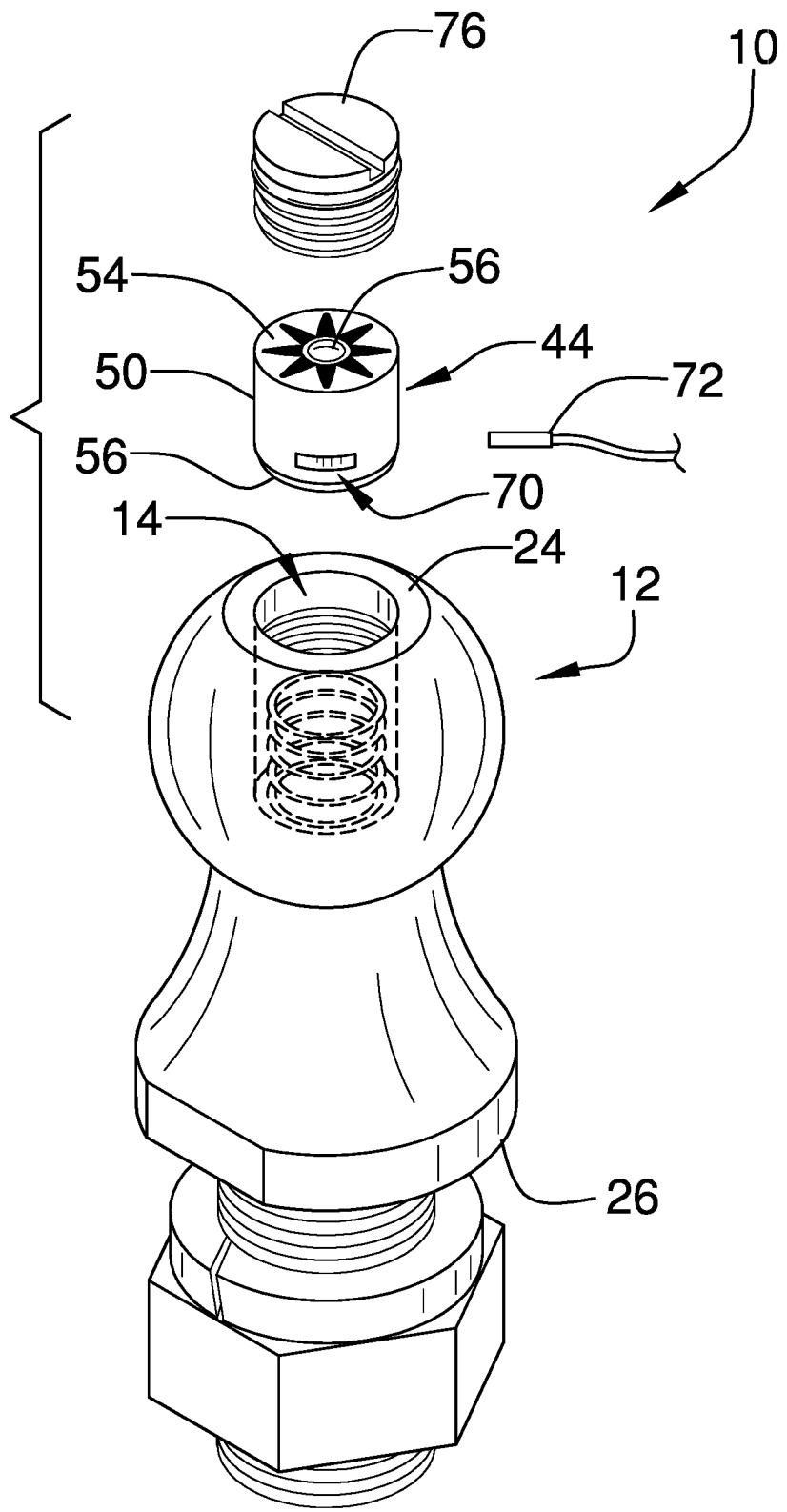
FIG. 2 is an exploded perspective view of a tow ball camera assembly according to an embodiment of the disclosure.
Figure 3:
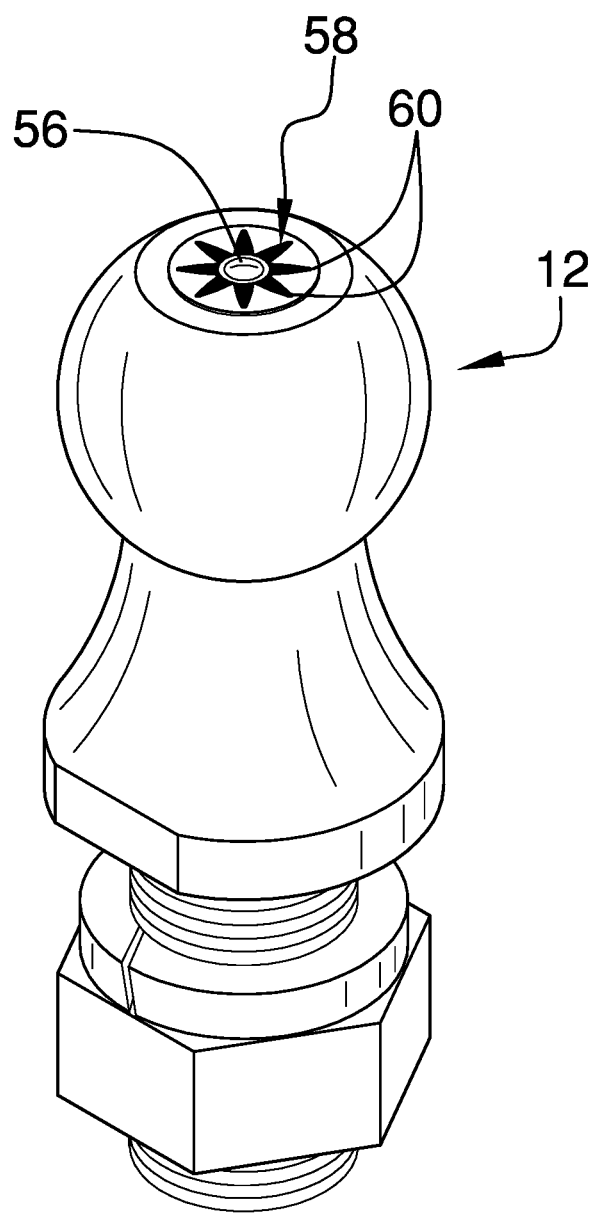
FIG. 3 is a top perspective view of an embodiment of the disclosure showing a cap being removed from a tow ball to expose a camera unit.
Figure 5:
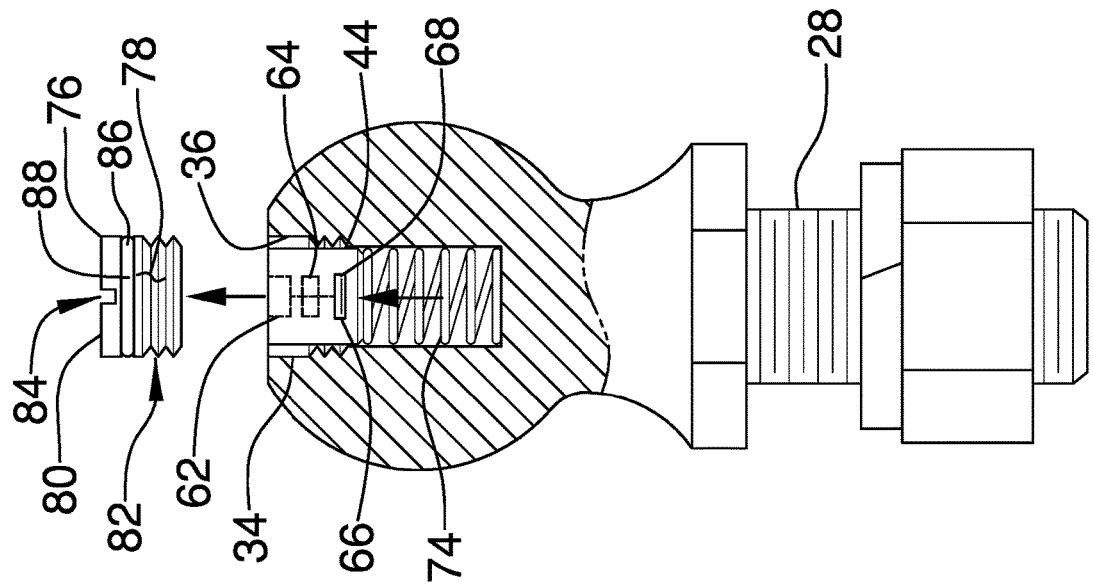
FIG. 5 is a front cut-away view of an embodiment of the disclosure showing a cap being removed from a tow ball.
Figure 4:
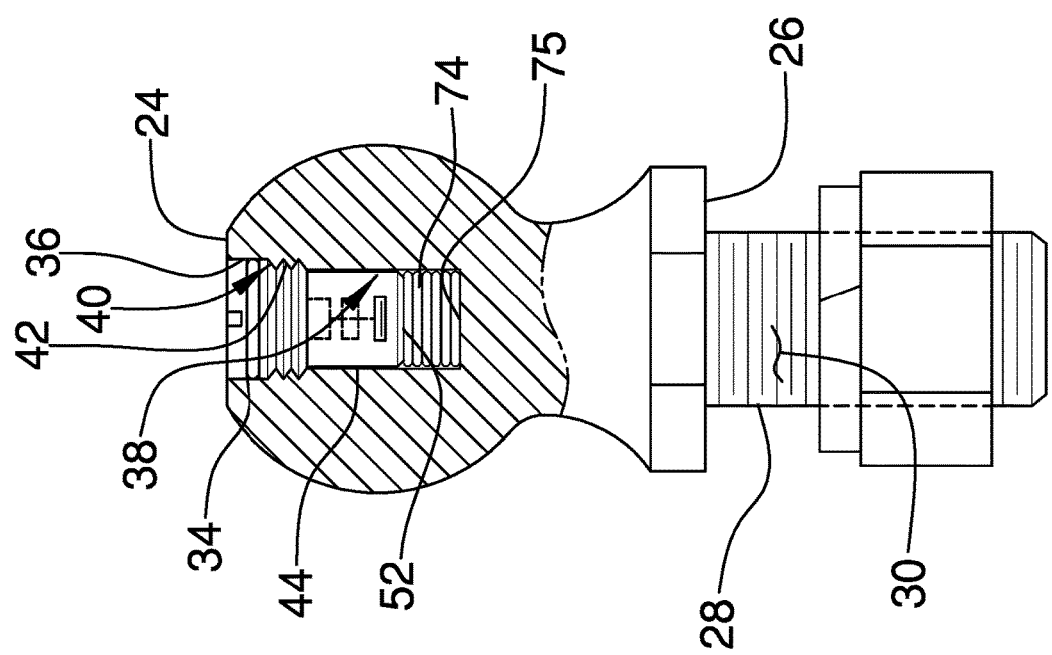
FIG. 4 is a front cut-away view of an embodiment of the disclosure showing a cap installed in a tow ball.
Figure 6:
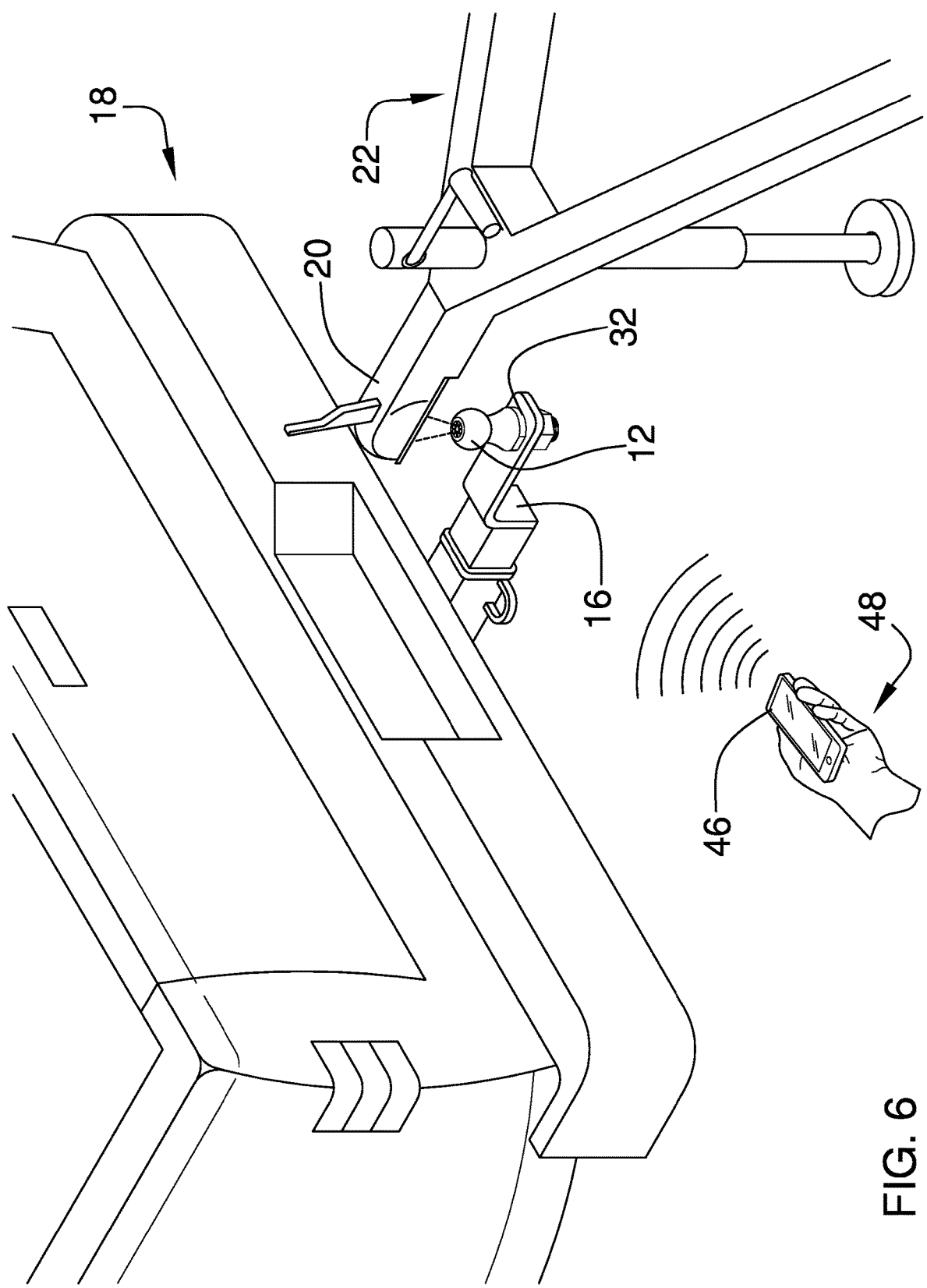
FIG. 6 is a perspective in-use view of an embodiment of the disclosure.

With reference now to the drawings, and in particular to FIGS. 1 through 6 thereof, a new tow ball device embodying the principles and concepts of an embodiment of the disclosure and generally designated by the reference numeral 10 will be described.

As best illustrated in FIGS. 1 through 6, the tow ball camera assembly 10 generally comprises a tow ball 12 that has a storage space 14 which is integrated into the tow ball 12. The tow ball 12 is attachable to a tow hitch 16 of a vehicle 18 thereby facilitating the tow ball 12 to engage a trailer hitch 20 on a trailer 22 thereby facilitating the vehicle 18 to tow the trailer 22. The vehicle 18 may be a pickup truck, for example, or other motorized vehicle 18 that is driven on public roadways. The trailer 22 may comprise a boat trailer, a cargo trailer or other type of trailer that would commonly be towed on the public roadways.

The tow ball 12 has an upper end 24 and a lower end 26 and the tow ball 12 has a shaft 28 extending downwardly from the lower end 26. The shaft 28 has an outer surface 30 that is threaded and the shaft 28 is extendable through a hole 32 in the tow hitch 16 thereby facilitating the lower end 26 of the tow ball 12 to rest on the tow hitch 16. The tow ball 12 has a well 34 extending downwardly in the upper end 24 toward the lower end 26 such that the well 34 defines the storage space 14. The well 34 has a bounding surface 36 and the bounding surface 36 has a lower portion 38 and an upper portion 40 extending between the lower portion 38 and the upper end 24 of the tow ball 12. The lower portion 38 has a diameter that is less than a diameter of the upper portion 40 and the upper portion 40 has threads 42 extending from the lower portion 38 toward the upper end 24 of the tow ball 12.

A camera unit 44 is insertable into the storage space 14 in the tow ball 12 thereby facilitating the camera unit 44 to capture imagery of the trailer hitch 20 when the vehicle 18 is backed to position the tow ball 12 beneath the trailer hitch 20. The camera unit 44 is in remote communication with a personal electronic device 46 thereby facilitating the personal electronic device 46 to display the imagery. In this way the personal electronic device 46 facilitates a driver 48 of the vehicle 18 to see when the tow ball 12 is properly positioned to attach the trailer hitch 20 to the tow ball 12. The personal electronic device 46 may comprise a smart phone or other similar type of electronic device that has an electronic display and wireless communication capabilities.

The camera unit 44 comprises a cylinder 50 that has a bottom end 52 and a top end 54. The cylinder 50 is positioned in the well 34 in the upper end 24 of the tow ball 12. The camera unit 44 includes a camera lens 56 that is integrated into the top end 54 of the cylinder 50 thereby facilitating the camera lens 56 to capture imagery above the tow ball 12. The top end 54 of the cylinder 50 has indicia 58 applied to the top end 54 comprising a plurality of points 60 radiating outwardly from the camera lens 56 such that the indicia 58 define a star shape.

The camera unit 44 includes a control circuit 62 that is integrated into the cylinder 50 and the control circuit 62 is electrically coupled to the camera lens 56. The camera unit 44 includes a transceiver 64 that is integrated into the cylinder 50. The transceiver 64 is electrically coupled to the control circuit 62 thereby facilitating the transceiver 64 to broadcast the imagery captured by the camera lens 56. The transceiver 64 is in wireless communication with the personal electronic device 46 thereby facilitating the personal electronic device 46 to receive the imagery captured by the camera lens 56. Furthermore, the transceiver 64 may comprise a radio frequency transceiver or the like and the transceiver 64 may employ Bluetooth communication capabilities.

The camera unit 44 includes a power supply 66 that is integrated into the cylinder 50 and the power supply 66 is electrically coupled to the control circuit 62. The power supply 66 comprises a rechargeable battery 68 that is positioned within the cylinder 50 and the rechargeable battery 68 is electrically coupled to the control circuit 62. The power supply 66 includes a charge port 70 that is recessed into the cylinder 50 thereby facilitating the charge port 70 to insertably receive a charge cord 72. Furthermore, the charge port 70 is electrically coupled to the rechargeable battery 68 for charging the rechargeable battery 68. The charge port 70 may comprise a micro universal serial bus port or other type of electronic charge port.

A biasing member 74 is positioned between the bottom end 52 of the cylinder 50 and a lower bounding surface 75 of the well 34. The biasing member 74 biases the cylinder 50 upwardly in the well 34 such that the top end 54 of the cylinder 50 is aligned with the upper end 24 of the tow ball 12. A cap 76 is removably attachable to the tow ball 12 and the cap 76 is positioned in the storage space 14 when the cap 76 is attached to the tow ball 12 thereby facilitating the cap 76 to conceal the camera unit 44. Conversely, the cap 76 is removable from the tow ball 12 to expose the camera unit 44.

The cap 76 has an outside surface 78 and an upper end 80 and the outside surface 78 has a threaded portion 82 which threadably engages the threads 42 in the upper portion 40 of the bounding surface 36 of the well 34 for retaining the cap 76 in the well 34. The upper end 24 of the cap 76 has a slot 84 for receiving a tool thereby facilitating the cap 76 to be tightened or loosened in the well 34. The outside surface 78 has a groove 86 that is positioned between the threaded portion 82 and the upper end 24 of the cap 76. Additionally, the groove 86 extends around a full circumference of the outside surface 78.

A gasket 88 is provided and the gasket 88 is positioned in the groove 86 in the outside surface 78 of the cap 76. The gasket 88 is compressed between the cap 76 and the bounding surface 36 of the well 34 when the cap 76 is threaded into the well 34. The gasket 88 is comprised of a resiliently compressible material thereby facilitating the gasket 88 to form a fluid impermeable seal between the cap 76 and the bounding surface 36 of the well 34. In this way the gasket 88 can inhibit water from entering the well 34 and damaging the camera unit 44.

In use, the cap 76 is removed from the well 34 when the vehicle 18 is going to be backed to attach the trailer hitch 20 to the tow ball 12 and the personal electronic device 46 is synced with the transceiver 64. In this way the camera unit 44 can view the area above the tow ball 12 and the personal electronic device 46 can display the area above the tow ball 12. Thus, the driver 48 of the vehicle 18 can view the personal electronic device 46 to determine when the tow ball 12 is aligned beneath the trailer hitch 20. The cap 76 is installed in the tow ball 12 and the trailer hitch 20 is lowered to engage the tow ball 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tow ball camera assembly for facilitating the alignment of a tow ball beneath a tow hitch to be remotely viewed, said assembly comprising:
   a tow ball having a storage space being integrated into said tow ball, said tow ball being attachable to a tow hitch of a vehicle thereby facilitating said tow ball to engage a trailer hitch on a trailer thereby facilitating the vehicle to tow the trailer;
   a camera unit being insertable into said storage space in said tow ball thereby facilitating said camera unit to capture imagery of the trailer hitch when the vehicle is backed to position said tow ball beneath the trailer hitch, said camera unit being in remote communication with a personal electronic device thereby facilitating said personal electronic device to display the imagery wherein said personal electronic device is configured to facilitate a driver of the vehicle to see when said tow ball is properly positioned to attach the trailer hitch to said tow ball; and
   a cap being removably attachable to said tow ball, said cap being positioned in said storage space when said cap is attached to said tow ball thereby facilitating said cap to conceal said camera unit, said cap being removable from said tow ball to expose said camera unit;
   said tow ball has an upper end and a lower end;
   said tow ball has a shaft extending downwardly from said lower end, said shaft having an outer surface being threaded, said shaft being extendable through a hole in the tow hitch thereby facilitating said lower end of said tow ball to rest on the tow hitch;
   said tow ball has a well extending downwardly in said upper end toward said lower end such that said well defines said storage space; and
   said well has a bounding surface, said bounding surface having a lower portion and an upper portion extending between said lower portion and said upper end of said tow ball, said lower portion having a diameter being less than a diameter of said upper portion, said upper portion having threads extending from said lower portion toward said upper end of said tow ball;
   wherein said camera unit comprises:
   a cylinder having a bottom end and a top end, said cylinder being positioned in said well in said upper end of said tow ball;
   a camera lens being integrated into said top end of said cylinder thereby facilitating said camera lens to capture imagery above said tow ball, said top end of said cylinder having indicia being applied to said top end comprising a plurality of points radiating outwardly from said camera lens such that said indicia define a star shape;
   a control circuit being integrated into said cylinder, said control circuit being electrically coupled to said camera lens;
   a transceiver being integrated into said cylinder, said transceiver being electrically coupled to said control circuit thereby facilitating said transceiver to broadcast said imagery captured by said camera lens, said transceiver being in wireless communication with said personal electronic device thereby facilitating said personal electronic device to receive said imagery captured by said camera lens; and
   a power supply being integrated into said cylinder, said power supply being electrically coupled to said control circuit, said power supply comprising:
   a rechargeable battery being positioned within said cylinder, said rechargeable battery being electrically coupled to said control circuit; and
   a charge port being recessed into said cylinder thereby facilitating said charge port to insertably receive a charge cord, said charge port being electrically coupled to said rechargeable battery for charging said rechargeable battery.

2. The assembly according to claim 1, further comprising a biasing member being positioned between said bottom end of said cylinder and a lower bounding surface of said well, said biasing member biasing said cylinder upwardly in said well such that said top end of said cylinder is aligned with said upper end of said tow ball.

3. A tow ball camera assembly for facilitating the alignment of a tow ball beneath a tow hitch to be remotely viewed, said assembly comprising:
   a tow ball having a storage space being integrated into said tow ball, said tow ball being attachable to a tow hitch of a vehicle thereby facilitating said tow ball to engage a trailer hitch on a trailer thereby facilitating the vehicle to tow the trailer;
   a camera unit being insertable into said storage space in said tow ball thereby facilitating said camera unit to capture imagery of the trailer hitch when the vehicle is backed to position said tow ball beneath the trailer hitch, said camera unit being in remote communication with a personal electronic device thereby facilitating said personal electronic device to display the imagery wherein said personal electronic device is configured to facilitate a driver of the vehicle to see when said tow ball is properly positioned to attach the trailer hitch to said tow ball; and
   a cap being removably attachable to said tow ball, said cap being positioned in said storage space when said cap is attached to said tow ball thereby facilitating said cap to conceal said camera unit, said cap being removable from said tow ball to expose said camera unit;
   said tow ball has an upper end and a lower end;
   said tow ball has a shaft extending downwardly from said lower end, said shaft having an outer surface being threaded, said shaft being extendable through a hole in the tow hitch thereby facilitating said lower end of said tow ball to rest on the tow hitch;
   said tow ball has a well extending downwardly in said upper end toward said lower end such that said well defines said storage space; and
   said well has a bounding surface, said bounding surface having a lower portion and an upper portion extending between said lower portion and said upper end of said tow ball, said lower portion having a diameter being less than a diameter of said upper portion, said upper portion having threads extending from said lower portion toward said upper end of said tow ball; and
   wherein said cap has an outside surface and an upper end, said outside surface having a threaded portion which threadably engages said threads in said upper portion of said bounding surface of said well for retaining said cap in said well, said upper end of said cap having a slot for receiving a tool thereby facilitating said cap to be tightened or loosened in said well, said outside surface having a groove being positioned between said threaded portion and said upper end of said cap, said groove extending around a full circumference of said outside surface.

4. The assembly according to claim 3, further comprising a gasket being positioned in said groove, said gasket being compressed between said cap and said bounding surface of said well when said cap is threaded into said well, said gasket being comprised of a resiliently compressible material thereby facilitating said gasket to form a fluid impermeable seal between said cap and said bounding surface of said well wherein said gasket is configured to inhibit water from entering said well and damaging said camera unit.

5. A tow ball camera assembly for facilitating the alignment of a tow ball beneath a tow hitch to be remotely viewed, said assembly comprising:
- a tow ball having a storage space being integrated into said tow ball, said tow ball being attachable to a tow hitch of a vehicle thereby facilitating said tow ball to engage a trailer hitch on a trailer thereby facilitating the vehicle to tow the trailer, said tow ball having an upper end and a lower end, said tow ball having a shaft extending downwardly from said lower end, said shaft having an outer surface being threaded, said shaft being extendable through a hole in the tow hitch thereby facilitating said lower end of said tow ball to rest on the tow hitch, said tow ball having a well extending downwardly in said upper end toward said lower end such that said well defines said storage space, said well having a bounding surface, said bounding surface having a lower portion and an upper portion extending between said lower portion and said upper end of said tow ball, said lower portion having a diameter being less than a diameter of said upper portion, said upper portion having threads extending from said lower portion toward said upper end of said tow ball;
- a camera unit being insertable into said storage space in said tow ball thereby facilitating said camera unit to capture imagery of the trailer hitch when the vehicle is backed to position said tow ball beneath the trailer hitch, said camera unit being in remote communication with a personal electronic device thereby facilitating said personal electronic device to display the imagery wherein said personal electronic device is configured to facilitate a driver of the vehicle to see when said tow ball is properly positioned to attach the trailer hitch to said tow ball, said camera unit comprising:
  - a cylinder having a bottom end and a top end, said cylinder being positioned in said well in said upper end of said tow ball;
  - a camera lens being integrated into said top end of said cylinder thereby facilitating said camera lens to capture imagery above said tow ball, said top end of said cylinder having indicia being applied to said top end comprising a plurality of points radiating outwardly from said camera lens such that said indicia define a star shape;
  - a control circuit being integrated into said cylinder, said control circuit being electrically coupled to said camera lens;
  - a transceiver being integrated into said cylinder, said transceiver being electrically coupled to said control circuit thereby facilitating said transceiver to broadcast said imagery captured by said camera lens, said transceiver being in wireless communication with said personal electronic device thereby facilitating said personal electronic device to receive said imagery captured by said camera lens; and
  - a power supply being integrated into said cylinder, said power supply being electrically coupled to said control circuit, said power supply comprising:
    - a rechargeable battery being positioned within said cylinder, said rechargeable battery being electrically coupled to said control circuit; and
    - a charge port being recessed into said cylinder thereby facilitating said charge port to insertably receive a charge cord, said charge port being electrically coupled to said rechargeable battery for charging said rechargeable battery;
- a biasing member being positioned between said bottom end of said cylinder and a lower bounding surface of said well, said biasing member biasing said cylinder upwardly in said well such that said top end of said cylinder is aligned with said upper end of said tow ball;
- a cap being removably attachable to said tow ball, said cap being positioned in said storage space when said cap is attached to said tow ball thereby facilitating said cap to conceal said camera unit, said cap being removable from said tow ball to expose said camera unit, said cap having an outside surface and an upper end, said outside surface having a threaded portion which threadably engages said threads in said upper portion of said bounding surface of said well for retaining said cap in said well, said upper end of said cap having a slot for receiving a tool thereby facilitating said cap to be tightened or loosened in said well, said outside surface having a groove being positioned between said threaded portion and said upper end of said cap, said groove extending around a full circumference of said outside surface; and
- a gasket being positioned in said groove, said gasket being compressed between said cap and said bounding surface of said well when said cap is threaded into said well, said gasket being comprised of a resiliently compressible material thereby facilitating said gasket to form a fluid impermeable seal between said cap and said bounding surface of said well wherein said gasket is configured to inhibit water from entering said well and damaging said camera unit.

6. A tow ball camera system for facilitating the alignment of a tow ball beneath a tow hitch to be remotely viewed, said assembly comprising:
- a vehicle having a tow hitch;
- a trailer having a trailer hitch;
- a tow ball having a storage space being integrated into said tow ball, said tow ball being attachable to said tow hitch of said vehicle thereby facilitating said tow ball to engage said trailer hitch on said trailer thereby facilitating said vehicle to tow said trailer, said tow ball having an upper end and a lower end, said tow ball having a shaft extending downwardly from said lower end, said shaft having an outer surface being threaded, said shaft being extendable through a hole in the tow hitch thereby facilitating said lower end of said tow ball to rest on the tow hitch, said tow ball having a well extending downwardly in said upper end toward said lower end such that said well defines said storage space, said well having a bounding surface, said bounding surface having a lower portion and an upper portion extending between said lower portion and said upper end of said tow ball, said lower portion having a diameter being less than a diameter of said upper portion, said upper portion having threads extending from said lower portion toward said upper end of said tow ball;

a camera unit being insertable into said storage space in said tow ball thereby facilitating said camera unit to capture imagery of said trailer hitch when said vehicle is backed to position said tow ball beneath said trailer hitch, said camera unit being in remote communication with a personal electronic device thereby facilitating said personal electronic device to display the imagery wherein said personal electronic device is configured to facilitate a driver of said vehicle to see when said tow ball is properly positioned to attach said trailer hitch to said tow ball, said camera unit comprising:

a cylinder having a bottom end and a top end, said cylinder being positioned in said well in said upper end of said tow ball;

a camera lens being integrated into said top end of said cylinder thereby facilitating said camera lens to capture imagery above said tow ball, said top end of said cylinder having indicia being applied to said top end comprising a plurality of points radiating outwardly from said camera lens such that said indicia define a star shape;

a control circuit being integrated into said cylinder, said control circuit being electrically coupled to said camera lens;

a transceiver being integrated into said cylinder, said transceiver being electrically coupled to said control circuit thereby facilitating said transceiver to broadcast said imagery captured by said camera lens, said transceiver being in wireless communication with said personal electronic device thereby facilitating said personal electronic device to receive said imagery captured by said camera lens; and a power supply being integrated into said cylinder, said power supply being electrically coupled to said control circuit, said power supply comprising:

a rechargeable battery being positioned within said cylinder, said rechargeable battery being electrically coupled to said control circuit; and a charge port being recessed into said cylinder thereby facilitating said charge port to insertably receive a charge cord, said charge port being electrically coupled to said rechargeable battery for charging said rechargeable battery;

a biasing member being positioned between said bottom end of said cylinder and a lower bounding surface of said well, said biasing member biasing said cylinder upwardly in said well such that said top end of said cylinder is aligned with said upper end of said tow ball;

a cap being removably attachable to said tow ball, said cap being positioned in said storage space when said cap is attached to said tow ball thereby facilitating said cap to conceal said camera unit, said cap being removable from said tow ball to expose said camera unit, said cap having an outside surface and an upper end, said outside surface having a threaded portion which threadably engages said threads in said upper portion of said bounding surface of said well for retaining said cap in said well, said upper end of said cap having a slot for receiving a tool thereby facilitating said cap to be tightened or loosened in said well, said outside surface having a groove being positioned between said threaded portion and said upper end of said cap, said groove extending around a full circumference of said outside surface; and a gasket being positioned in said groove, said gasket being compressed between said cap and said bounding surface of said well when said cap is threaded into said well, said gasket being comprised of a resiliently compressible material thereby facilitating said gasket to form a fluid impermeable seal between said cap and said bounding surface of said well wherein said gasket is configured to inhibit water from entering said well and damaging said camera unit.

* * * * *